April 2, 1935.　　　F. W. GILLIAND　　　1,996,239
BEAN HARVESTER
Filed Dec. 4, 1933
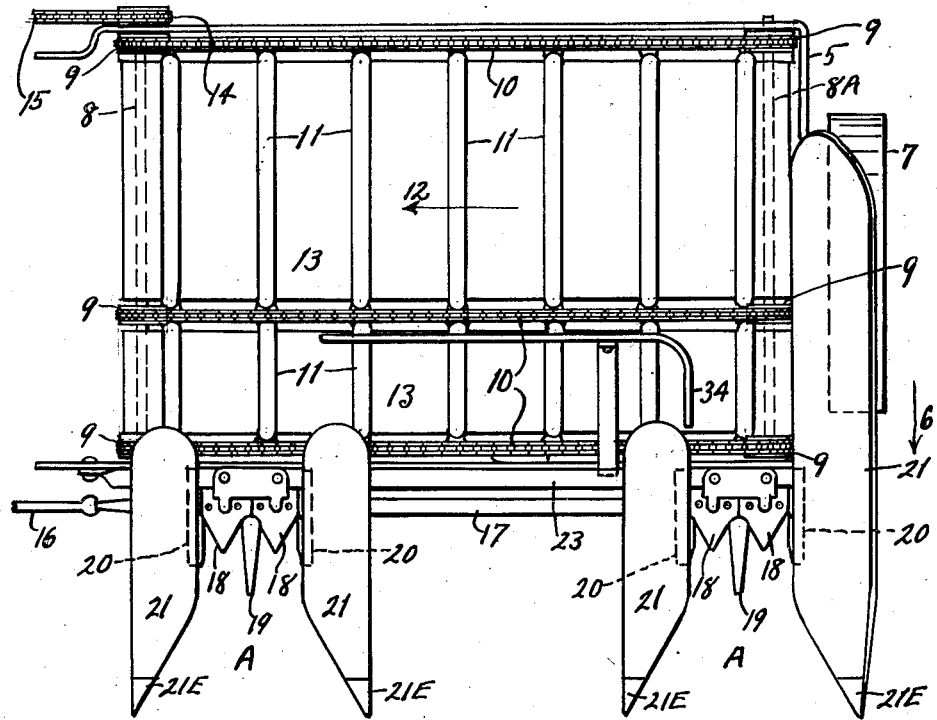
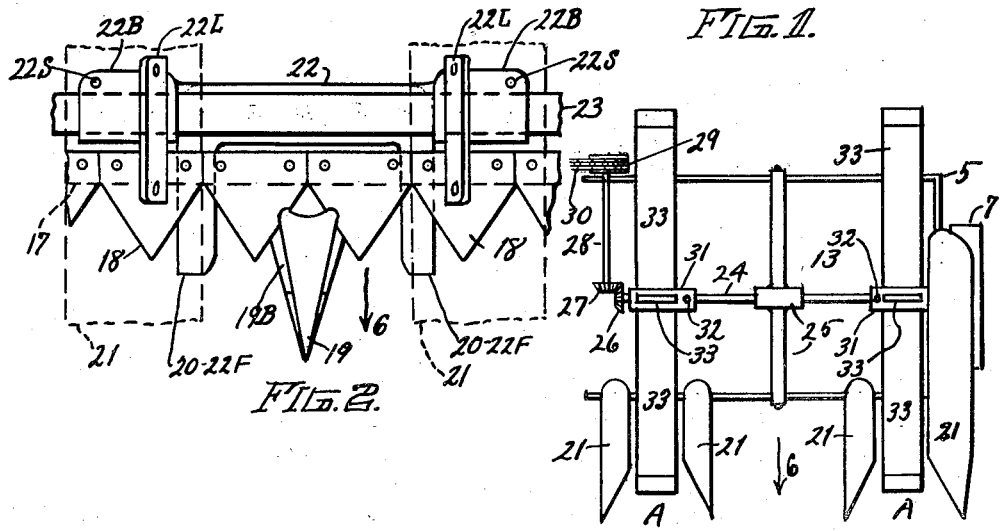
INVENTOR:
Francis W. Gilliand
BY David E. Carlsen
ATTORNEY.

Patented Apr. 2, 1935

1,996,239

UNITED STATES PATENT OFFICE 1,996,239

BEAN HARVESTER

Francis W. Gilliand, Dunkerton, Iowa

Application December 4, 1933, Serial No. 700,823

4 Claims. (Cl. 56—158)

My invention relates to a harvester designed particularly for reaping of beans.

The main object is to provide a simple highly efficient device for the above purpose this harvester being applicable as an attachment to other harvesting machines as hereinafter fully set forth.

Harvesting of beans has hitherto been a difficult procedure due mainly to the nature of the growth of bean vines and the variable distances between rows of said vines, and it is a further object of my invention to provide a device not only particularly adaptable for harvesting beans but readily adjustable to variable conditions such as just set forth.

In the accompanying drawing,—

Fig. 1 is a plan view of my improved bean harvester omitting the reel.

Fig. 2 is an enlarged detail top view of the gatherer and cutting means shown in the lower left part of Fig. 1.

Fig. 3 is a reduced scale view of Fig. 1 with a number of details omitted and showing a reel in operative position.

Referring to the drawing by reference numerals, my device comprises a substantially quadrangular frame 5 elongated transversely of the direction of travel of the device indicated by an arrow 6 (Fig. 1). The outer end of the frame, as to the right in Fig. 1, is supported by a ground wheel 7 and the opposite or inner end is provided with extensions 6A adapted to be removably secured to any suitable kind of harvesting machine (not shown) such as a grain reaper, thus supporting the frame in suitable plane relative to the ground.

8 and 8A are respectively an inner and an outer shaft, journaled and supported in the corresponding parts of the main frame, each carrying a suitable number of chain sprockets 9 for conveyor chains 10 connected by a series of suitably spaced conveyor bars or slats 11 traveling inwardly (longitudinally of the frame) in direction of arrow 12 with their upper runs, and over a stationary apron 13.

Shaft 8 is rotated by means of another chain sprocket 14 which is rotated by a chain 15 receiving motion from any available sprocket (not shown) on the reaper to which this device is attached. Rotation of shaft 8, thus provided for, will of course cause movement of the conveyor as described, when the reaper and my attachment are in motion.

16 in Fig. 1 designates the end portion of the reciprocable knife-bar actuator of a reaper, to the end (16A) of which is removably attachable one end of the knife bar 17 of my device and which latter bar is reciprocable and located parallel to and forward of the main frame of my device. This bar carries two sets of cutter knives 18, known each as a knife section, corresponding to the well known sections of reapers in general. There may be a continuous row of sections 18 on bar 17, but two groups are shown in Fig. 1, there being a stationary forwardly directed knife-finger 19 for each group, each of said fingers opening rearward and carrying another knife blade 19B contacted by sections 18 for cutting action. 20 are a pair of auxiliary fixed side cutter blades, in the same plane as fixed blade 19B, the two said auxiliary blades being spaced to right and left of a finger 19 and providing further cutting means in spaced relation to finger 19.

Therefore, between each set of auxiliary blades 20 is provided a cutting area or field, designated A in Fig. 1, between a pair of elongated board guides 21, usually mounted in angular planes to provide between them a throat or passage for vines to be guided rearwardly onto the apron 13 as the machine moves forward.

The outermost guide 21 is usually more elongated than the others, as shown.

22 is a casting with bearing boxes 22B adjustably secured as with screws 22S, or equivalent, to any part of a stationary bar 23, parallel to sickle bar 17 and forward of the frame 5. This casting, comprises in part, the finger 19, and furthermore is preferably formed with a pair of elongated lugs 22L for removably retaining the pair of guides 20 in spaced relation equidistant from both sides of finger 19. 22F are forwardly extending fingers, integral of the casting 22 and comprising the holding means for the auxiliary cutters 20 (see Fig. 2).

It will now be readily understood that my reaper means comprise two units adjustable longitudinally on bar 23, with relation to each other, and according to the distance between rows of beans to be harvested.

The fingers 19 and the forwardly pointed ends 21E must necessarily be in a plane close to the ground to insure proper contact and guiding of the bean vines to and past the sphere of cutting action in each unit.

In Fig. 3 is shown a reel comprising a shaft 24 longitudinally of and over the main frame and rotatable in a bearing bracket 25, said shaft rotatable by any suitable means such as the bevel gear 26 meshing with another bevel gear 27 on a shaft 28 rotated by a chain sprocket 29 which in turn is rotated by a drive chain 30 connected to any suitable available drive means, either on my device or on the reaper device to which it is attached (the latter means not shown).

The reel comprises further a pair of paddle-wheels, each comprising a hub 31, removably securable as at 32 to any part of shaft 24, each hub carrying a set of radial paddles (preferbly six in number) 33, each comprising preferably a sufficiently heavy board about 7 inches wide. Obviously both paddle wheels rotate simultaneously and are mounted at such height as to clear the apron and carrier. Each paddle wheel, being adjustable, is located according to the positions of the reaper units above described and rotate to sweep into the throats A downwardly and rearwardly, to contact the vines and throw them rearwardly onto the carrier.

In Fig. 1, 34 designates a fixed guide, over the carrier, extending rearwardly from a point directly back of the inner guide board 21 of the outer cutting unit, thence curved and extending toward the inner end of the carrier. This guide is preferably of sheet iron and high enough to guide the cut vines onto the rear half of the carrier. Thus the products carried from the outer unit are not mixed or piled up on the products passing inward from the inner cutting unit.

It is optional as to disposition of the cut products moving inwardly. If the construction of the harvesting implement used is such that the cut products may be delivered to carriers or wagons, from the carrier of my device, all well and good. Or, it may be most convenient to allow the cut products to be dropped off of the carrier of my device, to the ground, where it lies in uniform rows.

The use of my device has been fully disclosed in the foregoing description.

As previously stated it is designed primarily as an attachment for other farm implements but it is obvious that the device may also be constructed as an independent implement by merely incorporating suitable draft means and another ground wheel, power being available from either such wheel.

I claim:

1. A bean harvester comprising a frame supported by a wheel at one end and means at the opposite end for securing the latter to any suitable draft implement provided with reciprocating knife bar means, said frame being quadrangular, a stationary apron mounted in said frame, an endless conveyor including two series of slats movable over said apron in a direction transversely of the direction of movement of the harvester and inwardly from the support means a reciprocating cutter bar with cutter sections mounted forward of and parallel to the frame, a stationary bar mounted also forward of the frame parallel to the reciprocating bar secondary cutting means on the latter bar comprising two sets of blades adjustable with relation to each other and the cutting edges of the latter blades securable in coacting cutting relation with the cutter sections of the reciprocable bar.

2. The structure specified in claim 1, in which said secondary cutter means comprise each a main base formed with a pair of parallel upwardly exposed cutter blades, a central removable cutter blade intermediate the parallel blades, and a pair of guide boards removably securable in spaced parallel relation and directed forwardly from the knives and over the latter.

3. The structure specified in claim 1, in which said secondary cutter means comprise each a main base formed with a pair of parallel upwardly exposed cutter blades, a central removable cutter blade intermediate the parallel blades, and a pair of guide boards removably securable in spaced parallel relation and directed forwardlly from the knives and over the latter said guide boards of both cutter units extending rearwardly and over the endless conveyor, and a guide member fixed on the frame, over the conveyor to guide cut products from the outer cutter unit onto the rear parts of the conveyor, for the purpose set forth.

4. In a bean harvester as described comprising a quadrangular frame, a wheel supporting one end and means at the other end for securing the frame to a draft implement, an endless carrier movable inwardly from the wheel supported end, a reciprocable cutter bar mounted forward of the frame, and having a row of knife sections, a pair of auxiliary cutter devices mounted to be secured in selective spaced relation to each other said cutter devices having secondary cutter means to co-act with any two groups of the reciprocable blades and all said cutting means directed forwardly, and a reel suitably mounted over the frame and having two sets of radial blades each set adjustably securable and adapted to be rotated to impel cut products rearwardly onto the carrier according to the respective positions of the auxiliary cutter devices.

FRANCIS W. GILLIAND.